United States Patent
Yan et al.

(10) Patent No.: US 9,878,528 B2
(45) Date of Patent: Jan. 30, 2018

(54) PREPARATION METHOD OF GRAPHENE/METAL COMPOSITE BOARD

(71) Applicant: AVIC BEIJING INSTITUTE OF AERONAUTICAL MATERIALS, Beijing (CN)

(72) Inventors: Shaojiu Yan, Beijing (CN); Cheng Yang, Beijing (CN); Qihu Hong, Beijing (CN); Dabo Liu, Beijing (CN); Shenglong Dai, Beijing (CN); Zuoming Lin, Beijing (CN)

(73) Assignee: AVIC BEIJING INSTITUTE OF AERONAUTICAL MATERIALS, Beijing (CN)

( * ) Notice: Subject to any disclaimer, the term of this patent is extended or adjusted under 35 U.S.C. 154(b) by 0 days.

(21) Appl. No.: 15/281,790

(22) Filed: Sep. 30, 2016

(65) Prior Publication Data

US 2017/0015092 A1 Jan. 19, 2017

Related U.S. Application Data

(63) Continuation of application No. PCT/CN2014/075217, filed on Apr. 11, 2014.

(30) Foreign Application Priority Data

Apr. 4, 2014 (CN) .......................... 2014 1 0136469

(51) Int. Cl.
*B32B 37/12* (2006.01)
*F41H 5/04* (2006.01)
*B32B 7/12* (2006.01)
*B32B 15/01* (2006.01)
*C01B 31/04* (2006.01)
*B32B 37/24* (2006.01)
*B32B 37/10* (2006.01)

(52) U.S. Cl.
CPC ............... *B32B 37/12* (2013.01); *B32B 7/12* (2013.01); *B32B 15/01* (2013.01); *B32B 15/016* (2013.01); *C01B 31/0484* (2013.01); *F41H 5/0442* (2013.01); *B32B 37/10* (2013.01); *B32B 2037/243* (2013.01); *B32B 2255/06* (2013.01); *B32B 2255/20* (2013.01); *B32B 2255/26* (2013.01); *B32B 2307/54* (2013.01); *B32B 2309/02* (2013.01); *B32B 2311/24* (2013.01); *B32B 2313/04* (2013.01)

(58) Field of Classification Search
CPC ....................................................... B32B 37/12
See application file for complete search history.

(56) References Cited

U.S. PATENT DOCUMENTS

2012/0315482 A1* 12/2012 Muramatsu ............. C01B 31/04
428/402

* cited by examiner

*Primary Examiner* — Daniel Lee
(74) *Attorney, Agent, or Firm* — Osha Liang LLP

(57) ABSTRACT

A method for preparing a graphene/metal composite sheet includes adding polyvinyl alcohol into distilled water and heat to about 100° C. under stirring to prepare a polyvinyl alcohol solution; dispersing graphene in distilled water using ultrasonication to prepare a graphene solution; mixing the polyvinyl alcohol solution and the graphene solution to form a graphene/polyvinyl alcohol mixed slurry; after a metal sheet is subjected to a surface activation treatment, coating the graphene/polyvinyl alcohol mixed slurry onto the metal sheet at both upper and lower surfaces; vacuum sintering to remove the polyvinyl alcohol in the surface coating to obtain a graphene/metal plate; overlaying at least two graphene/metal plates and bonding them together via hot isostatic pressing to form multilayer graphene/metal plates; and hot rolling the bonded multilayer graphene/metal plates to form the graphene/metal composite sheet.

11 Claims, No Drawings

PREPARATION METHOD OF GRAPHENE/METAL COMPOSITE BOARD

TECHNICAL FIELD

The present invention is a method for preparing graphene/metal composite sheet, which belongs to the technical field of composite materials.

TECHNICAL BACKGROUND

Graphene is a new type of 2D nanomaterial, whose tension strength reaches 1.01 Tpa, 100 times of that of steel while the density is only steel's ⅕. Since the traditional method can hardly promote the strength of metal material, graphene became another significant orientation for reinforcing the metal materials. Graphene is composed of one-molecule-thick planar sheet of sp2 bonded carbon molecules, which packed into a honeycomb network, ranging in length between 20 μm~50 μm. Up-to-date, there are two main methods, physical and chemical, for synthesizing graphene and the latter one stands out as the primary strategy that can yield large amounts of chemically modified graphene. Due to the small density, it can improve the metal material strength while reducing the density of the material. Meanwhile Graphene also has ultra-high electron mobility (200000 $cm^2/V·S$), electrical conductivity, thermal conductivity (5000 W/m·K) Young's modulus (1100 GPa), and other excellent performance, and therefore with regards graphene composite to aluminum, titanium, magnesium and other metal materials, it's expected to get lightweight, high strength materials with both electrical and thermal conductivity and other features integrated.

Due to the huge differences of the nature between the graphene and the metal material, it is difficult to mold graphene and metal matrix composite. It's found that both home and abroad methods, graphene reinforced metallic matrix composites are mainly using graphene powder mixed with metal powder by powder metallurgy process to prepare graphene reinforced material. There is no report on the use of graphene slurry to prepare graphene metal sheet composite.

SUMMARY

The present invention provides a method for preparing graphene/metal composite sheet aimed at the existing technical conditions. The method uses a slurry to prepare high strength graphene composite metal sheet, by spraying a slurry graphene was coated onto the surface of the metal plate, and then after a hot rolling process, high strength graphene composite sheet was prepared. Such a high-strength sheet has excellent prospects in the field of lightweight armor materials, aviation, aerospace and other engineering applications.

The present invention is achieved by the following technical solution:

This kind of graphene/metal composite sheet production method, wherein: the step of the method is:

(1) Add 50 g PVA into 450 ml distilled water and heated to 100° C. under stirring to prepare the PVA solution.

(2) Disperse 25 g graphene in 475 ml distilled water and ultrasound with Ultrasonic cell crushing apparatus for over 30 min to prepare the graphene solution.

(3) Mix the polyvinyl alcohol (PVA) solution in step (1) and graphene solution in step (2) to form graphene/PVA mixed slurry.

(4) After the metal sheet is subjected to a surface activation treatment, graphene/polyvinyl alcohol mixed slurry is coated to the metal sheet at both upper and lower surfaces by spraying, the coating thickness is greater than 100 μm;

(5) By vacuum sintering or in the protective atmosphere of argon to remove polyvinyl alcohol in the metal sheet surface coating and obtain graphene sheet metal; the vacuum sintering temperature is 500° C., (6) Overlay not less than two plates of graphene/metal sheets and bond them together via hot isostatic manner.

(7) Hot roll the plates in step (6) to form the composite sheets. The hot rolling process can make graphene disperse homogenously in the metal plate matrix which reinforces the strength of the plate significantly.

The advantages and benefits are:

First, in this method monodisperse graphene homogeneous solution was prepared via ultrasonic oscillations, the monodispersed graphene was mixed with polyvinyl alcohol to get graphene/polyvinyl alcohol solution. With the mix solution, the disperse property of graphene can be guaranteed.

Second, via roll-bonding manner to prepare the composite sheet is in favor of the dispersion of graphene in the matrix and develop the reinforce effect.

Third, compared with the other reinforcing materials such as SiC, graphene has better toughness. During rolling process, graphene also has lubricating effect, which is beneficial for molding rolled metal;

Fourth, the present invention achieves the molecular level combination of graphene and the metal sheet, and can better retain the graphene and metal material intrinsic properties;

Fifth, the present invention has simple process and lower production costs for preparing a large number of large-sized graphene composite sheet. In the field of lightweight armor materials and aviation, aerospace and other engineering applications, the invention has excellent prospects.

DETAILED DESCRIPTION

The following examples will combine the technical aspect of the present invention and describe in detail.

Example 1

The procedure of preparing graphene reinforced metal material are as follows:

(1) Add 50 g PVA into 450 ml distilled water and heated to 100° C. under stirring to prepare the PVA solution.

(2) Disperse 25 g graphene in 475 ml distilled water and ultrasound with Ultrasonic cell crushing apparatus for 30 min to prepare the graphene solution.

(3) Uniformly mix the PVA solution in step (1) and graphene solution in step (2) to form graphene/PVA slurry.

(4) Choose three to five blocks of aluminum alloy sheets with thickness 1 mm~4 mm or 6~10 aluminum alloy sheets with thickness 1 mm~2 mm, after surface activation treatment, descaling, clean and dry, spraying the graphene/polyvinyl alcohol mixture slurry to an aluminum alloy sheet at both upper and lower sides, the spraying procedure is divided and completed in 10 times, each time the total thickness of coating about 10 μm, the final coating is 100 μm~120 μm;

(5) By vacuum sintering method or in the protective atmosphere of argon to remove polyvinyl alcohol in the metal sheet surface coating and obtain graphene sheet metal; the vacuum sintering temperature is 500° C., (6) After overlaying multiple sheets of the graphene-alloy together, bond them via hot isostatic manner at 480° C., 110 MPa, 2 h.

(7) Hot roll the multi-layer plates in step (6) to form the composite sheets of graphene combined aluminum at 440° C.~480° C.

Although only a few example embodiments have been described in detail above, those skilled in the art will readily appreciate that many modifications are possible in the example embodiments without materially departing from this invention. Accordingly, all such modifications are intended to be included within the scope of this disclosure as defined in the following claims.

What is claimed:

1. A method for preparing a graphene/metal composite sheet, wherein: the method comprises:
    adding polyvinyl alcohol into distilled water and heat to about 100° C. under stirring to prepare a polyvinyl alcohol solution;
    dispersing graphene in distilled water using ultrasonication to prepare a graphene solution;
    mixing the polyvinyl alcohol solution and the graphene solution to form a graphene/polyvinyl alcohol mixed slurry;
    after a metal sheet is subjected to a surface activation treatment, coating the graphene/polyvinyl alcohol mixed slurry onto the metal sheet at both upper and lower surfaces;
    vacuum sintering to remove the polyvinyl alcohol in the surface coating to obtain a graphene/metal plate;
    overlaying at least two graphene/metal plates and bonding them together via hot isostatic pressing to form multi layer graphene/metal plates; and
    hot rolling the bonded multilayer graphene/metal plates to form the graphene/metal composite sheet.

2. The method of claim 1, wherein the ultrasonication is for about 30 minutes.

3. The method of claim 1, wherein the graphene/polyvinyl alcohol mixed slurry is coated onto the metal sheet by spraying.

4. The method of claim 1, wherein the thickness of the coating is greater than 100 μm.

5. The method of claim 1, wherein the vacuum sintering temperature is 500° C.

6. The method of claim 1, wherein the hot isostatic pressing is done at a temperature of about 480° C.

7. The method of claim 1, wherein the hot isostatic pressing is done at a pressure of about 110 MPa.

8. The method of claim 1, wherein the hot isostatic pressing lasts for about two hours.

9. The method of claim 1, wherein the hot rolling is done at a temperature between about 440° C. and 480° C.

10. The method of claim 1, wherein the polyvinyl alcohol solution has a weight:volume ratio of polyvinyl alcohol:water of about 1:9.

11. The method of claim 1, wherein the graphene solution has a weight:volume ratio of graphene:water of about 1:19.

* * * * *